United States Patent [19]

Sano et al.

[11] Patent Number: 4,848,912
[45] Date of Patent: Jul. 18, 1989

[54] APPARATUS FOR MEASURING A SHAPE

[75] Inventors: Kazuo Sano; Mitsuaki Uesugi; Masami Harayama; Yoshihiro Okuno; Hiroshi Matsunaga; Yoichi Matsuju, all of Tokyo, Japan

[73] Assignee: NKK Corporation, Tokyo, Japan

[21] Appl. No.: 149,607

[22] Filed: Jan. 28, 1988

[30] Foreign Application Priority Data

Feb. 4, 1987 [JP] Japan .................. 62-22506

[51] Int. Cl.$^4$ ............................................. G01B 11/24
[52] U.S. Cl. .................... 356/376; 356/394; 356/24.4
[58] Field of Search .............. 356/376, 384, 385, 394, 356/244

[56] References Cited

U.S. PATENT DOCUMENTS

| | | | |
|---|---|---|---|
| 3,947,129 | 3/1976 | Wiklund | 356/385 |
| 4,122,525 | 10/1978 | Eaton | 356/387 |
| 4,129,384 | 12/1978 | Walker et al. | 356/381 |
| 4,778,274 | 10/1988 | Yogo | 356/376 |

FOREIGN PATENT DOCUMENTS 3526917 2/1987 Fed. Rep. of Germany ...... 356/385

51-132856 5/1975 Japan .

Primary Examiner—Richard A. Rosenberger
Attorney, Agent, or Firm—Frishauf, Holtz, Goodman & Woodward

[57] ABSTRACT

An apparatus for measuring shapes, comprises a scanner, having a plurality of arms for holding an object the shape of which is to be measured, and a turntable to which one end of each of the arms is fixed; and a device for forming a silhouette image of the object including a first optical system which has an optical axis parallel to a rotating axis of the turntable and which has a light source and a light receiving unit confronting each other to allow the object to be in between the light source and the light receiving unit of the first optical system, and a second optical system which has another optical axis substantially at a right angle to the rotating axis of the turntable and which has another light source and another light receiving unit confronting each other to allow the object to be in between the light source and the light receiving unit of the second optical system. A calculating device calculates a shape of the object, based on electric signals converted from an intensity pattern of light which has been formed by the device for forming a silhouette image of the object.

8 Claims, 4 Drawing Sheets

APPARATUS FOR MEASURING A SHAPE

BACKGROUND OF THE INVENTION

1. Field of the Invention

The present invention relates to an apparatus for measuring a shape of an object, and more particularly to an apparatus for measuring a shape of an object, by means of shooting a beam of light on the object and forming a silhouette image of the object.

2. Description of the Prior Arts

In order to increase productivity, inspection of bend shapes of bent bars or pipes is required to be performed in a short time. The inspection has been hitherto carried out through visual observation by an inspector by means of inspection tools. This way of inspection has a drawback in that there is not a little possibility of missing a defect at the time of inspection, and the quality of products cannot be fully guaranteed. In addition, there has been also difficulty in feeding back the results of the inspection to change operation conditions of a bending machine, even if shape defects of bent bars or pipes are found. This is because the visual observation is not performed quantitatively. Owing to these disadvantages, automation of shape inspection of bent bars or pipes has been strongly demanded.

To overcome these disadavantages, an apparatus for evaluating the bend shape of bent bars or pipes is disclosed, as prior art, in Japanese Patent Application Laid Open (KOKAI) No. 132856/76, which comprises:

(a) a pair of image formation devices having optical systems, each, composed of an optical axis approximately at a right angle to the longitudinal axis of an objective bar to be measured, and of a light source and a light receiving unit confronted each other to allow, the objective bare to be in between them so that the optical systems may be arranged to cross at right angles each other;

(b) said pair of the image formation devices being set in plurality and in a direction of the longitudinal axis of the objective bar; and (c) means for converting intensity pattern of light, at an image formation position of each of said image formation devices, into an electric signals and means for calculating bending shape, based on the electric signals.

This prior art apparatus is applicable to those bars which have such a small bending curve as to be regarded almost as linear and still are satisfactory for inspection if deviation of those bars are sampled at several points in the longitudinal direction. However, this apparatus has a drawback in that it is not applicable to those bars having large bending curves and, furthermore, a number of bending portions. This is because:

(l) shape deviation must be measured in every point of a bent bar;

(m) depending on bend shape, an axis of the bend bar forms an angle almost parallel to an optical axis of optical systems; and (n) depending on bend shape, two or more points of the bend bar are formed overlappedly on a receiving unit as well.

SUMMARY OF THE INVENTION

It to an object of the present invention is provide an apparatus for measuring shapes of bent bars or pipes having large bending curves and a number of bending portions in a short time.

In accordance with the present invention, an apparatus for measuring a shape of an object is provided, comprising:

scanning means including a plurality of arms for holding an object to be measured and a turntable to which one end of each of the arms are fixed;

means for forming a silhouette image of the object, including a first optical system which has an optical axis parallel to a rotating axis of the turntable and which has a light source and a light receiving unit confronting each other to allow the object to be between the light source and the light receiving unit of the first optical system, and a second optical system which has another optical axis almost at a right angle to the rotating axis of the turntable and which has another light source and another light receiving unit confronting each other to allow the object to be between the light source and the light receiving unit of the second optical system; and means for calculating a shape of the object, based on electric signals converted from an intensity pattern of light formed by the means for forming a silhouette image of the object.

The above object and other objects and advantages will become more apparent from the detailed description to follow, taken in conjunction with the appended drawings.

DESCRIPTION OF THE PREFERRED EMBODIMENT

Now, with reference to the drawings, a preferred embodiment of the present invention will be described.

Figure 1:
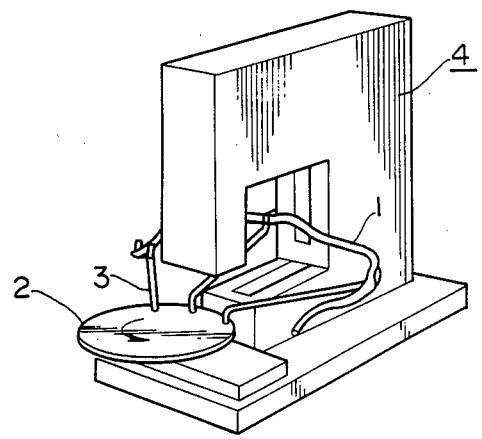
FIG. 1 is a perspective view schematically showing an embodiment of an apparatus for measuring a shape of an object according to the present invention.
Figure 2:
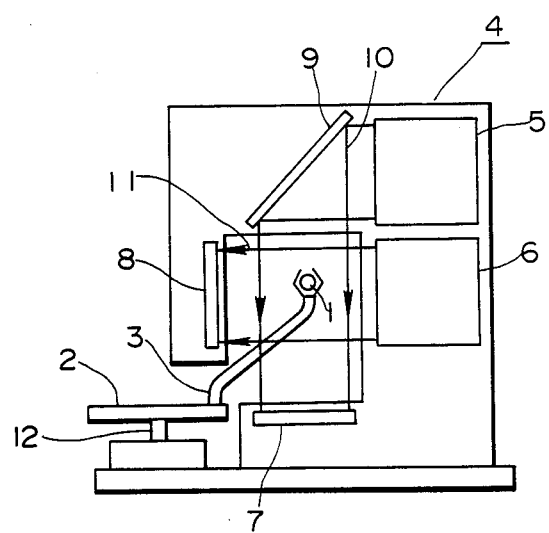
FIG. 2 is a vertical sectional view showing a construction of means for forming a silhouette image of an object according to the present invention.

FIG. 1 of the drawings schematically illustrates an embodiment of an apparatus for measuring a shape of an object. In FIG. 1, referential numeral 2 denotes a turntable holding a means for scanning. Turntable 2 has a rotating axis 12 (see FIG. 2) at its center and rotates through the rotating axis which is turned by a stepping motor. A plurality of arms 3 are fixed to the turntable 2, each arm 3 having a holder with a U shaped end to hold a bent bar 1. When a bent bar with a different shape and size is measured, different arms 3 suitable for such a bent bar can be used. Thus, this apparatus is usable for any sort of a bent bar with various shapes and sizes by selecting an appropriate radius of rotation of arms 3. Referential numeral 4 denotes means for forming a silhouette image of an object. FIG. 2 is a vertical sectional view showing a construction of the means for forming a silhouette image of an object according to the present invention. An apparatus 4 for measuring a shape is equipped with two parallel ray light sources 5 and 6, two contact image sensors 7 and 8 and reflecting mirror 9. Luminous flux being shot out of parallel ray light source 5 is reflected to form luminous flux 10 parallel to rotating axis 12 of turntable 2, and luminous flux 10 is shot on bent bar 1. A silhouette image of bent bar 1 is formed on contact image sensor 7 which is a light receiving unit set parallelly to the level of turntable 2. In the meantime, luminous flux is shot out of parallel ray light source 6 in a direction of rotating axis 12 and still crosses, at a right angle, luminous flux 10 parallel to rotating axis 12 to form luminous flux 11. Luminous flux 11 is shot on bent bar 1. A silhouette image of bent bar 1 is formed on contact image sensor 8 which is a light receiving unit set parallelly to rotating axis 12 of turntable 2.

As a light source, any of a parallel ray light source, a diffused ray light source, a diverging ray light source and a converging ray light source is available, but the parallel ray light source is preferable. The reason is that firstly, light rays, shot out of parallel ray light sources are parallel, and spacial coherence is so high that blur of the silhouette images is less, regardless of a shape of a bent bar, this resulting in improving resolution, and that secondly, the light rays being neither divergent nor convergent, the silhouette image is not affected by change of distance between the bent bar and the light source or the light receiving unit. As the parallel ray light source, a white light parallel ray light source and a laser parallel ray light source can be used, but the laser parallel ray light source is preferable, since it has higher parallelism and less change of light quantity.

Figure 3:
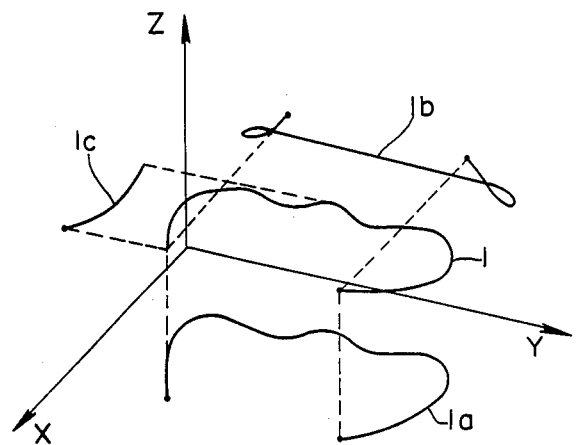
FIG. 3 is a representation illustrating a principle of a method for forming a silhouette image of an object related to the present invention.

As a sensor for a light receiving unit, a linear array sensor can be used. As the linear array sensor, a contact image sensor is preferable since it does not require an image formation system. Consequently, the apparatus can be simplified and, at the same time, efficiency in making use of light is high. A sensor comprising one or more linear image sensors of the line scan type can be used as the contact image sensor. This linear image sensor comprises 2048 light receiving elements of 100 $\mu$m$\times$100 $\mu$m in size placed linearly with a pitch of 125 $\mu$m so as to output voltage serially in proportion to amount of light received by each of the light receiving elements. Furthermore, another method can be used wherein a silhouette image formed on a screen is projected by means of a linear array camera. Secondly, the reason for forming silhouette images of bent bar 1 by means of a pair of optical systems of means for forming a silhouette image of the bent bar will be described with reference to the drawings. FIG. 3 schematically illustrates a principle of a method for forming a silhouette image of an object, related to the present invention. When bent bar 1 with large bending curves and many bent portions is viewed through a rectangular coordinate system of (X, Y, Z) as shown in FIG. 3, the shape of the bent bar is represented by a many-valued function. Images each viewed from X, Y and Z axes, are represented as projections 1b, 1c, and 1a, respectively on the YZ plane, ZX plane and XY plane. Accordingly, as clearly seen from FIG. 3, two points of the bent bar are overlapped with each other, for example, such as projections 1b on the YZ plane and 1c on the ZX plane, and, resultantly, shapes of some portions of the bent bar fail to be measured.

Figure 4:
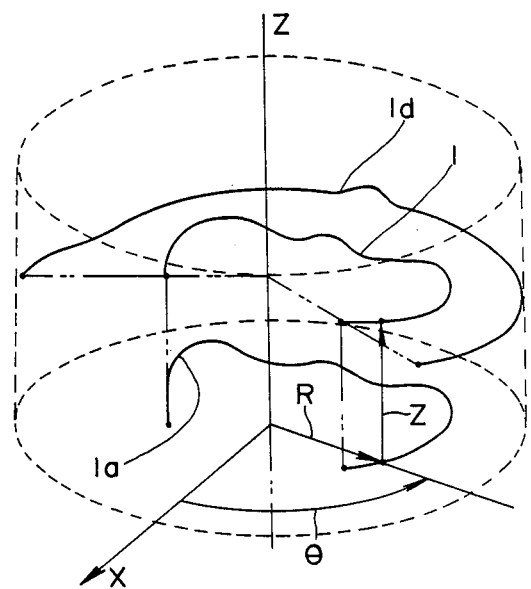
FIG. 4 is a representation illustrating a principle of a method for forming a silhouette image of an object according to the present invention.

FIG. 4 schematically shows a principle of a method of forming a silhouette image of an object according to the present invention. When bent bar 1 is viewed through a cylindrical coordinate system of (R, $\theta$, Z) as shown in FIG. 4, the shape of the bent bar is represented as a one-valued function in respect to angle $\theta$. Accordingly, if projection 1a of the bent bar formed in a direction of the Z axis and projection 1d of the bent bar formed in direction of R are viewed as angle $\theta$ is being changed, there are no points of those projections found to be overlapped. Consequently, in spite of a bent bar having large bending curves and many bent portions, the shapes of the bent bar can be accurately measured and evaluated. In the present invention, the above-mentioned being taken into consideration, the bar is projected in the directions of the Z axis and R, as the bar is being rotated.

Figure 5:
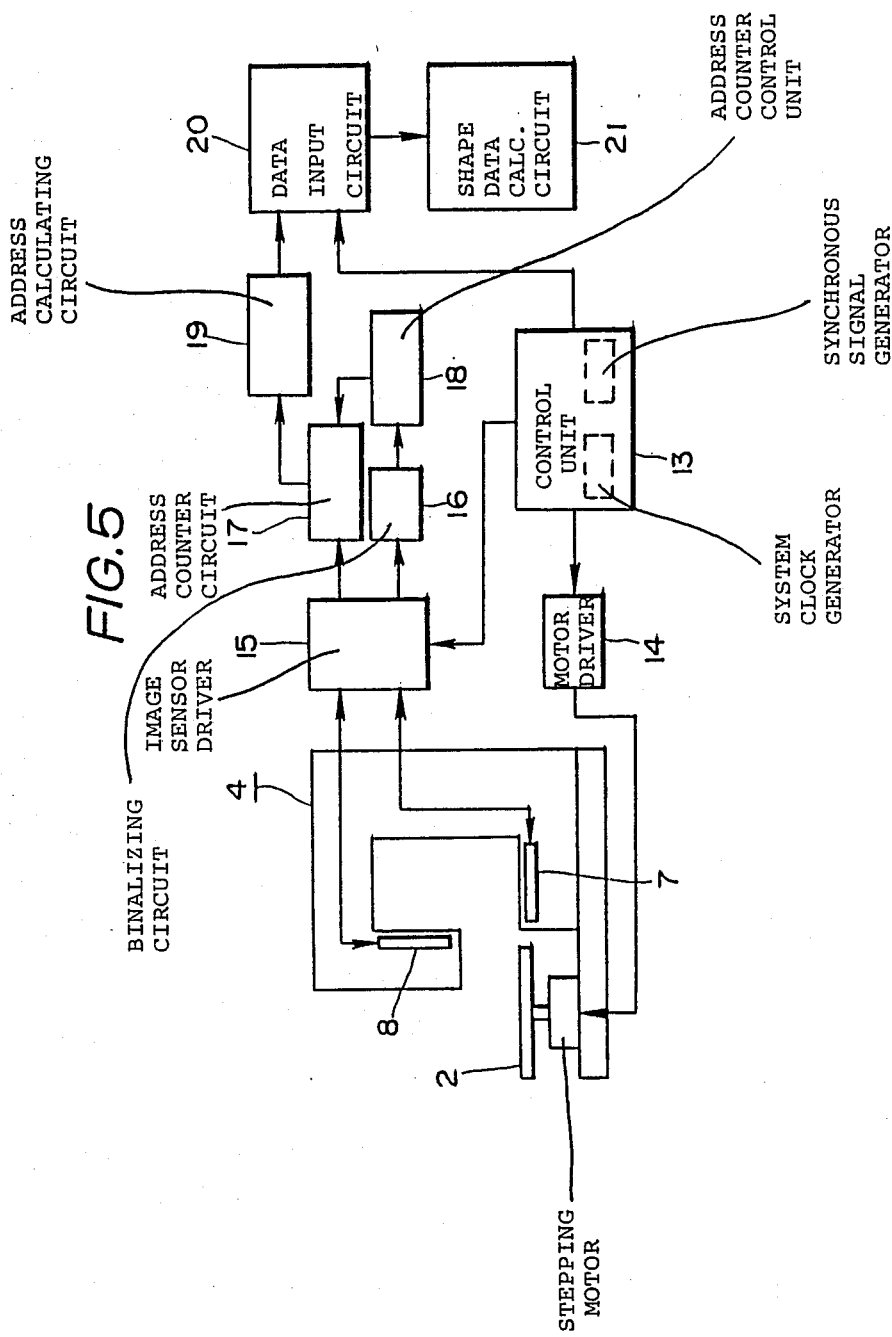
FIG. 5 is a block diagram showing a construction of means for calculating a shape, of an object, according to the present invention.

Subsequently, a shape of bent bar 1 is measured by means of processing silhouette image signals. FIG. 5 schematically shows a block diagram illustrating a construction of means for calculating a shape which constitutes an apparatus for measuring shapes. Means for calculating a shape comprises: control unit 13 comprising a system clock generator and a synchronous signal generator; a motor driver 14 driving a stepping motor which rotates turntable 2; contact image sensors 7 and 8 and image sensor driver 15 sending and receiving signals; circuit 16 for binalizing input signals; address counter circuit 17 for computing element addresses of a receiving unit, address counter control circuit 18 for detecting two edge portions of a silhouette image; address calculating circuit 19 for computing a center address and an address width between two edge portion addresses of the image silhouette; data input circuit 20 for storing the center address and the address width in memory; and shape data calculating circuit 21 for reading the center address stored in the data input circuit to repersent it in a cordinate system.

Now, the operation of the means for calculating a shape thus constituted will be explained.

CONTROL UNIT

Control unit 13 is equipped with a system clock generator and a synchronous signal generator. The synchronous signal generator sends signals which the system clock generator puts out. The function of control unit 13 is to synchronize motions of motor driver 14, image sensor driver 15 and data input circuit 20. The instant a command signal of starting measurement of a shape of a bent bar is sent to control unit 13, the control unit sends a starting signal to motor driver 14, image sensor driver 15 data input circuit 20. The measurement of the shape of the bent bar is thus started.

MOTOR DRIVER

Motor driver 14 drives a stepping motor set in the means for scanning by means of a signal starting operation, and then turns turntable 2 to rotate bent bar 1 held by arms 3 fixed to turntable 2 at a constant pitch of a predetermined angle.

IMAGE SENSOR DRIVER

Image sensor driver 15 receives a synchronous signal from control unit 13 to send a starting signal every pitch that bent bar 1 rotates, and line scanning is thus started.

IMAGE SENSOR

Figure 6:
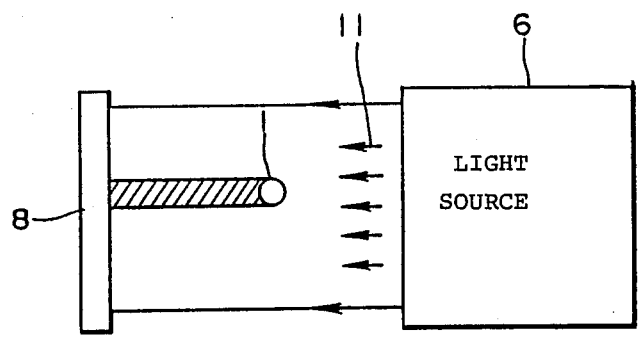
FIG. 6 is a schematic representation showing operation of the means for forming a silhouette image of an object according to the present invention.
Figure 7:
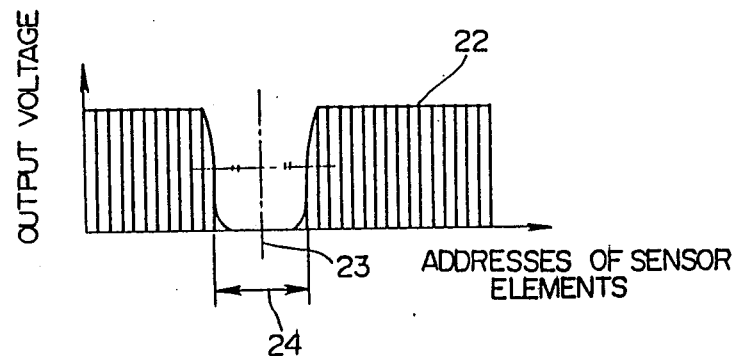
FIG. 7 is a graphic representation of a wave-form of video signals showing the output voltage of each of the sensor elements according to the present invention.

Contact image sensors 7 and 8 are set so as to let the output voltage of every element be saturated when light beams shot out of the parallel ray light sources are not interrupted, namely when bent bar 1 is not crossed by any of the light beams. FIG. 6 schematically shows the operation of means for forming a silhouette image of an object according to the present invention. As shown in FIG. 6, when bent bar 1 crosses each of the optical paths, the silhouette images are formed on contact image sensors 7 and 8 and then, the output voltages of all the elements become zero. The output voltages of all the elements are sent to image sensor driver 15. From image sensor driver 15, video signals 22 corresponding to an address of every one of the sensor elements are put out on circuit 16 for binalizing signals. FIG. 7 graphically represents a wave-form of the video signals showing the output voltage of every sensor element according to the present invention. The addresses shown in FIG. 7 are the ones of silhouette images of bent bar 1 which are formed when output voltage is zero. A shape of bent bar 1 can be detected by means of counting, as center address 23, a center of address, where output voltage is zero. Even in the case where the silhouette images have blur, if the blur is limited to the extent that both of the edge portions of the images are almost symmetrically blurry, the influence of the blur is cancelled by means of calculating the center address 23 of the images. Furthermore, positions of arms 3 holding bent bar 1 can be detected by means of counting a change of address width 24.

CIRCUIT FOR BINALIZING

Circuit 16 for binalizing comprises an amplifier, a sample-hold circuit and a voltage comparator. After being amplified and sample-held by system clock signal, video signals 22 transmitted from image sensor driver 15 are binalized by means of the voltage comparator, on a basis of determining an appropriate voltage value as a threshold. Center address 23 and address width 24 of a silhouette image can be computed from addresses of elements on contact image sensors 7 and 8 corresponding to both edges of the binalized signals.

ADDRESS COUNTER CIRCUIT

To count both edge addresses of silhouette images projected on each of contact image sensors 7 and 8, four counters are provided in address counter 17. Each counter of the four counters is reset at the instant a starting signal is sent from control unit 13 to image sensor driver 15. During measurement of a shape of bent bar 1, system clock signals are counted, and element addresses of contact image sensors 7 and 8 in a scanning operation are shown.

ADDRESS COUNTER CONTROL CIRCUIT

Address counter control circuit 18 is comprised of flip-flop circuits. Two edge portions projected on contact image sensors 7 and 8 are detected at the times when a binalized signal goes up from 0 to 1 and when the binalized signal goes down from 1 to 0. The detected edge signals are sent to address counter 17, and then, the two edge portions' addresses of a silhouette image are kept by means of the corresponding counters thereto. The stored addresses of the two edge portions of the images are sent to address calculating circuit 19.

ADDRESS CALCULATING CIRCUIT

Address calculating circuit 19 comprises an adder, a divider and a subtractor. Center address 23 is computed by summing up addresses of both edge portions of a silhouette image projected on each of contact image sensors 7 and 8 and then dividing the summed-up figure by two. Furthermore, an address width 24 between both edge portions is counted by computing the distance between the both edge portions. The counted center address 23 and address width 24 are sent to data input circuit 20.

DATA INPUT CIRCUIT

In data input circuit 20, center address 23 and address width 24 of the both edge portions computed in address calculating circuit 19 are sequentially stored in memory. The center address 23 and address width 24 are written in memory every time bent bar 1 makes one round trip from the start of measurement of a shape of the bent bar. Upon completion of scanning, every data is sequentially stored in the memory of data input circuit 20.

SHAPE DATA CALCULATING CIRCUIT

In shape data calculating circuit 21, data of center address 23 and address width 24 stored in data input circuit 20 are read out. To each data of center address 23, scale conversion is applied, and a bent shape of bent bar 1 is represented in a cylindrical coordinate system of $(R, \theta, Z)$. The data represented in the cylindrical coordinate system are converted into data represented in a rectangular coordinate system, and restored in memory. Data obtained at the time when a silhouette image of arms 3 is formed on contact image sensors 7 and 8 are detected by means of change of data of address width 24. Center address 23 corresponding to these data are made null and, at the same time, data of center address 23 made null is interpolated by data processed therebefore and thereafter, and even a shape of bent bar 1 which is a portion held by arms 3 is clarified.

The process of shape evaluation of bent bar 1 will now be described. Firstly, a master piece shape is measured, and registered as a master table shape. And, judgement is made as to acceptance or rejection of a test piece shape by means of comparison of the test piece shape with the master table shape. When a piece shape is defective, defect portions of the piece shape are shown.

Comparison of a test piece shape with the master shape table is performed either by a deviation evaluating method or by a pattern matching method. The deviation evaluating method computes position deviation in measurement of every point in comparison of the test piece shape with the master table shape. The pattern matching method represents the master piece shape as a binalized image pattern picture, and applied dilation treatment with allowance of width to the binalized picture to form a shape master pattern. Checking whether the test piece shape meets the shape master pattern in respect to every measurement point of the test piece shape follows.

It should be noted that this embodiment of measuring a shape of bent bar 1 can also apply to measurement of a shape of a bent pipe.

The present invention provides the following advantages:

(A) Bent bars or pipes, which are hard to measure, by means of rectangular coordinate system, in respect to their shape because of having large bending curves and many bending portions, can be easily measured. Furthermore, allowance of a center shape of a master piece is ±2 mm, while a center shape of the bars or pipes has such an excellent precision of being within a range of ±0.5 mm. This is because bent bars or pipes to be measured are allowed to be rotated by scanning means, and a specific lighting and projecting system is applied to these rotating bent bars or pipes. Namely, one luminous flux having an optical axis parallel to a rotating axis, and another luminous flux having an optical axis at a right angle to the rotating axis are shot on these bent bars or pipes to form their silhouette images in every point.

(B) There is no need for preparing inspection tools depending on kinds and shapes of objects such as bent bars. This reduces inspection cost, and resultantly contributes economically to supplying products to customers. In addition, workers are released from handling heavy inspection tools. This is because this apparatus can be applicable to various objects such as bent bars, by means of determining rotating radius by means of arms holding the objects, depending on their shapes and sizes, when they are scanned.

(C) Measurement can be performed at every point of the objects automatically and quantitatively. Besides, measuring time can be shortened so much that the total time summing up data input and data calculation is not more than 10 seconds. Consequently, oversighting at the time of inspection is overcome, and quality of products can fully be guaranteed.

(D) This apparatus allows master shapes of the objects to be registered, measured data to be compared with the registered data and the results of the comparison to be fed back to a bending machine. Thanks to utilization of the feed back system, much more advanced measurement performance can be attained.

What is claimed is:

1. An apparatus for measuring shapes comprising:
    scanning means comprising a plurality of arms for holding an object whose shape is to be measured and a turntable to which one end of each of the arms is fixed;
    means for forming a silhouette image of the object, comprising:
        a first optical system which has an optical axis parallel to a rotating axis of the turntable and which has a light source and a light receiving unit confronting each other to allow the object to be in between the light source and the light receiving unit of the first optical system, and
        a second optical system which has another optical axis substantially at a right angle to the rotating axis of the turntable and which has another light source and another light receiving unit confronting each other to allow the object to be in between the light source and the light receiving unit of the second optical system; and
    calculating means for calculating a shape of the object, based on electric signals converted from an intensity pattern of light formed by said means for forming a silhouette image of the object.

2. An apparatus according to claim 1, wherein the object includes at least one of a bent bar and a bent pipe.

3. An apparatus according to claim 1, wherein the light source of the first optical system and the light source of the second optical system each comprise parallel ray light sources.

4. An apparatus according to claim 3, wherein the parallel ray light sources each comprise laser parallel ray sources.

5. An apparatus according to claim 1, wherein the light receiving unit of the first optical system and the light receiving unit of the second optical system include linear array sensors.

6. An apparatus according to claim 5, wherein the linear array sensors each comprise a contact image sensor.

7. An apparatus according to claim 1, wherein the calculating means for calculating a shape of the object, comprises:
    a control unit including a system clock generator and a synchronous signal generator;
    a circuit for binalizing input signals;
    an address counter circuit for computing element addresses of a receiving unit;
    an address counter control circuit for detecting two edge portions of a silhouette image;
    an address calculating circuit for computing a center address and an address width between the two edge portion addresses;
    a data input circuit for storing the center address and the address width in memory; and
    a shape data calculating circuit for reading out the center address stored in the data input circuit to represent the center address in a coordinate system.

8. An apparatus according to claim 7, wherein the shape data calculating circuit includes:
    circuit means for converting the center address into a coordinate representation, the shape of the object being represented in a cylindrical coordinate system; and
    means for representation and for storing the rectangular coordinate system representation in memory.

* * * * *